(12) United States Patent
Phillips et al.

(10) Patent No.: US 9,065,811 B2
(45) Date of Patent: Jun. 23, 2015

(54) METHODS, APPARATUS, AND COMPUTER PROGRAM PRODUCTS FOR COMMUNICATING CONTENT FILES BASED ON DESTINATION PRIORITY

(71) Applicant: Ericsson Television Inc., Duluth, GA (US)

(72) Inventors: Chris Phillips, Hartwell, GA (US); Jennifer Ann Reynolds, Duluth, GA (US); Robert Hammond Forsman, Sugar Hill, GA (US); Charles Hammett Dasher, Lawrenceville, GA (US)

(73) Assignee: ERICSSON TELEVISION INC., Duluth, GA (US)

( * ) Notice: Subject to any disclaimer, the term of this patent is extended or adjusted under 35 U.S.C. 154(b) by 329 days.

(21) Appl. No.: 13/856,968

(22) Filed: Apr. 4, 2013

(65) Prior Publication Data

US 2014/0304362 A1  Oct. 9, 2014

(51) Int. Cl.
*G06F 15/16* (2006.01)
*H04L 29/08* (2006.01)

(52) U.S. Cl.
CPC ................................. *H04L 67/06* (2013.01)

(58) Field of Classification Search
USPC ................. 709/203, 217, 219; 370/329, 392; 714/18
See application file for complete search history.

(56) References Cited

U.S. PATENT DOCUMENTS

| 7,275,111 B2* | 9/2007 | Cabrera et al. ............... 709/219 |
| 7,978,653 B2* | 7/2011 | Sasaki et al. .................. 370/329 |
| 2011/0058554 A1* | 3/2011 | Jain et al. ...................... 370/392 |
| 2013/0268807 A1* | 10/2013 | Spencer et al. ................ 714/18 |

* cited by examiner

*Primary Examiner* — Quang N Nguyen (57) ABSTRACT

A method for communicating content files based on destination priority includes processing a content file to determine a plurality of destination sites to which the content file is to be transmitted, assigning priority levels to the plurality of destination sites, allocating a plurality of bandwidth portions on a communication link to the plurality of destination sites, respectively, based on the priority levels assigned to the plurality of destination sites, and transmitting the content file to the plurality of destination sites using the plurality of bandwidth portions allocated to the plurality of destination on the communication link, respectively.

18 Claims, 6 Drawing Sheets

FIG. 9

METHODS, APPARATUS, AND COMPUTER PROGRAM PRODUCTS FOR COMMUNICATING CONTENT FILES BASED ON DESTINATION PRIORITY

TECHNICAL FIELD

The present disclosure relates to communication networks and, more particularly, to allocation of bandwidth for communicating content files in a communication network.

BACKGROUND

Content owners may have one or more files that they need to transfer from one location to multiple other locations, which may be geographically distinct. For example, a news reporter may record a segment for presentation on a nightly news broadcast at several locations around the country. Conventional file distribution systems generally use "best effort" communication schemes, which can result in a random distribution of files without taking into account user preference or destination priority, in the case of the news reporter application, for example, it may be more critical to get the recorded news segment to television stations on the east coast than it is to get the recorded news segment to television stations on the west coast due to the time difference between the different geographic locations. Without the ability to prioritize based on destination, however, communication resources, such as bandwidth, may not be efficiently allocated in distributing content files. Files may reach lower priority destinations at the same time or earlier than higher priority destination with no benefit to the early arrival at the low priority destinations, but potential negative repercussions for a late arrival at a higher priority destination.

SUMMARY

Some embodiments of the inventive subject matter are directed to a method for communicating content files based on destination priority. The method includes processing a content file to determine a plurality of destination sites to which the content file is to be transmitted, assigning priority levels to the plurality of destination sites, allocating a plurality of bandwidth portions on a communication link to the plurality of destination sites, respectively, based on the priority levels assigned to the plurality of destination sites, and transmitting the content file to the plurality of destination sites using the plurality of bandwidth portions allocated to the plurality of destination on the communication link, respectively.

Advantageously, embodiments of the present inventive subject matter may allow for bandwidth on an outgoing communication link to be partitioned based on priority levels assigned to various destination sites so that higher priority destinations may receive a greater share of the available bandwidth relative to lower priority destinations. As a result, content delivery can be better tuned to satisfy user needs as opposed to delivering the content randomly without regard to the priorities or needs associated with the various destination sites. Moreover, by prioritizing delivery of content based on destination and, for example, specifying a time that content needs to reach a destination site, embodiments of the present inventive subject matter may dynamically adjust the use of outgoing, bandwidth to deliver the content by the specified time. This may reduce the need for human monitoring and auditing to ensure that content files reach destination sites in a timely manner.

The priority levels may be assigned to the different destination sites based on various criteria including, but not limited to, the geographic locations of the destination sites, the subject matter contained in the content file, an agreement with an entity associated with one of the destination sites, such as a financial agreement, a transmission speed of a destination network associated with a destination site, and/or a file format associated with the content file.

In other embodiments, assigning the priority levels to the plurality of destination sites includes identifying a time by which the content file is to reach one of the plurality of destination sites, determining a size of the one of the plurality of bandwidth portions associated with the one of the plurality of destination sites based on the time that was identified, and assigning the priority levels based on the site of the one of the plurality of bandwidth portions that was determined.

In still other embodiments, the method further includes maintaining a queue comprising, a plurality of content files and prioritizing the plurality of content files for transmission. The content file to be communicated to a destination site is the content file in the queue having the highest priority for transmission.

Other methods, apparatus, and computer program products according to embodiments of the inventive subject matter will be or become apparent to one with skill in the art upon review of the following drawings and detailed description. It is intended that all such additional methods, apparatus, and computer program products be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a pan of this application illustrate certain non-limiting embodiment(s) of the invention. In the drawings.

DETAILED DESCRIPTION

The invention will now be described more fully hereinafter with reference to the accompanying drawings, in which embodiments of the invention are shown. This invention may, however, be embodied in many different forms and should not be construed as limited to the embodiments set forth herein.

Some embodiments are directed to content file distribution where a communication network resource, such as bandwidth, is allocated based on priority levels assigned to various destination sites for the content file. A content file may be processed to determine which destination sites the file is to be transmitted to. Priority levels may be assigned to the various destination sites and the outgoing bandwidth on a communication link to the destination sites may be partitioned based on the priority levels assigned to the various destination sites. The content file is then transmitted to the various destination sites using the bandwidth portions allocated to the different destination sites, respectively.

The priority levels may be assigned to the different destination sites based on various criteria including, but not limited to, the geographic locations of the destination sites, the subject matter contained in the content file, an agreement with an entity associated with one of the destination sites, such as a financial agreement, a transmission speed of a destination network associated with a destination site, and/or a file format associated with the content file. The priority levels may also be assigned to the destination sites by specifying a desired time that the destination file should reach a destination site and determining the size of the bandwidth portion associated with that destination site based on the time that was specified. Thus, if it is desired that a content file reach a particular destination site in a short amount of time, increased, bandwidth can be allocated to the communication link for transmitting the content file to that particular destination site. Embodiments of the present inventive subject matter may, therefore, allow for bandwidth on an outgoing communication link to be partitioned based on priority levels assigned to various destination sites so that higher priority destinations may receive a greater share of the available bandwidth relative to lower priority destination so that content delivery can be better tuned to satisfy user needs as opposed to delivering the content randomly without regard to the priorities or needs associated with the various destination sites.

Figure 1:
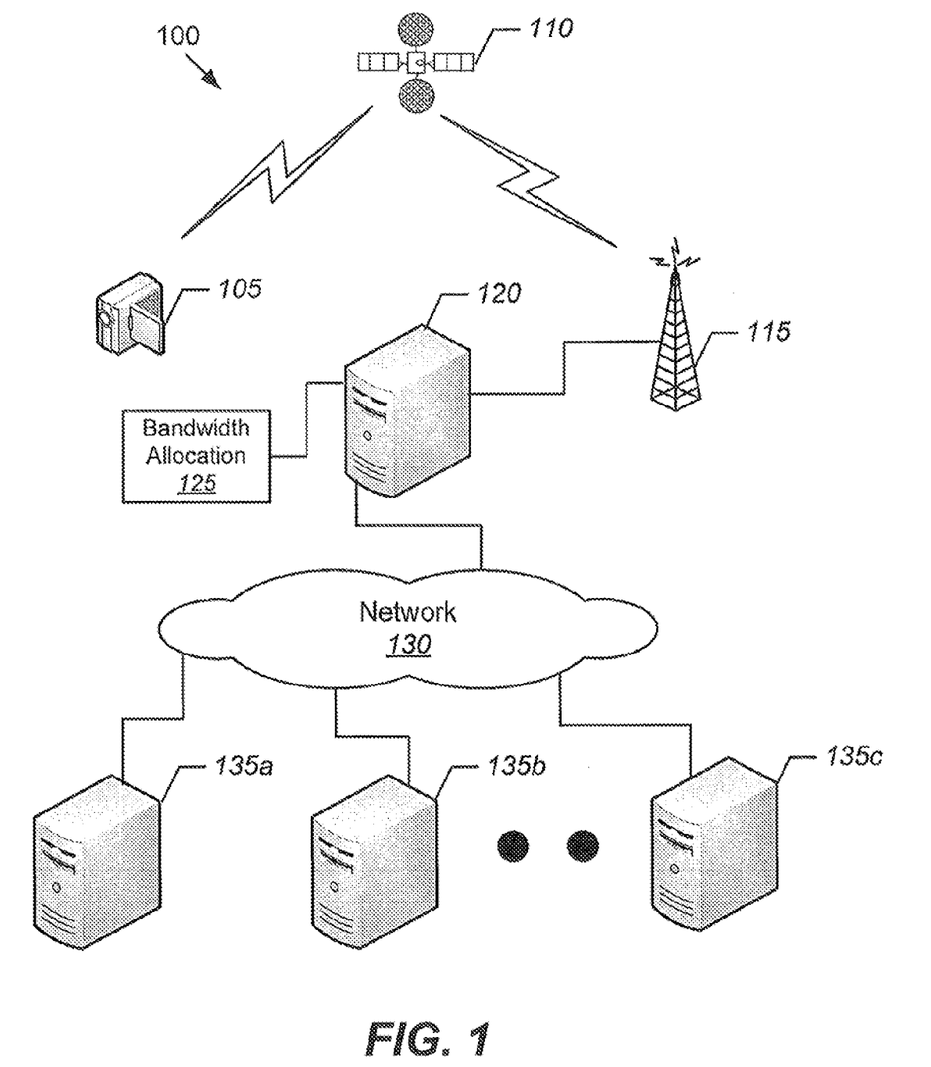
FIG. 1 is a block diagram of a communication network for communicating content files based on destination priority according to some embodiments of the inventive subject matter.

FIG. 1 is a block diagram of a communication network 100 for communicating content files based on destination priority according to some embodiments of the inventive subject matter. The communication network 100 includes a content owner that creates a content file using, for example, a recording device 105. The content file may be communicated via satellite 110 through a base station 115 to a content server 120 for distribution to a plurality of destination sites 135a, 135b, and 135c. The content server 120 is connected to the plurality of destination sites 135a, 135b, and 135c via a network 130. The network 130 may be a global network, such as the Internet or other publicly accessible network. Various elements of the network 130 may be interconnected by a wide area network, a local area network, an Intranet, and/or other private network, which may not be accessible by the general public. Thus, the communication network 130 may represent a combination of public and private networks or a virtual private network (VPN). The network 130 may be a wireless network, a wireline network, or may be a combination of both wireless and wireline networks. The content server 120 further includes a bandwidth allocation module 125. The bandwidth allocation module 125 may be configured to assign priority levels to the various destination sites 135a, 135b, and 135c and to allocate portions of the outgoing bandwidth from the content server to the various destination sites based on the assigned priority levels.

Although FIG. 1 illustrates an exemplary communication network according to some embodiments of the inventive subject matter, it will be understood that the present invention is not limited to such configurations, but is intended to encompass any configuration capable of carrying out the operations described herein.

Figure 2:
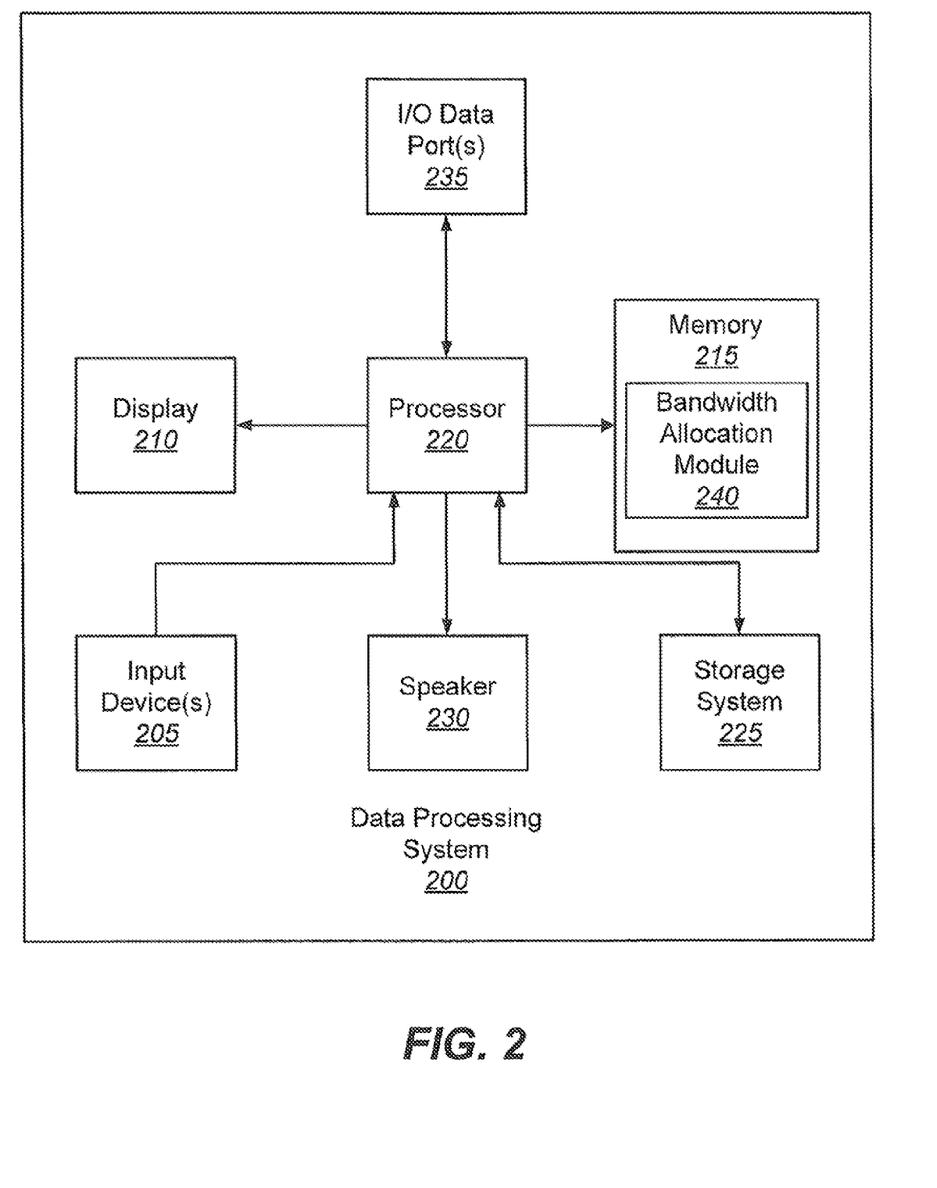
FIG. 2 is a block diagram that illustrates a data processing system including a bandwidth allocation module according to some embodiments of the inventive subject matter.

FIG. 2 illustrates a data processing system 200 that may be used, for example, to implement the content server 120 of FIG. 1 and may include a bandwidth allocation module, in accordance with some embodiments of the inventive subject matter. The data processing system 200 comprises input device(s) 205, such as a keyboard or keypad, a display 210, and a memory 215 that communicate with a processor 220. The data processing system 200 may further comprise a storage system 225, a speaker 230, and an I/O data port(s) 235 that also communicate with the processor 220. The storage system 225 may include removable and/or fixed media, such as floppy disks, ZIP drives, hard disks, or the like as well as virtual storage such as a RANIDISK. The I/O data port(s) 235 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 215 may be configured with a bandwidth allocation module 240 that may be used to allocate the bandwidth on an outgoing communication link to content destination sites based on relative priorities assigned to the destination sites.

Figure 3:
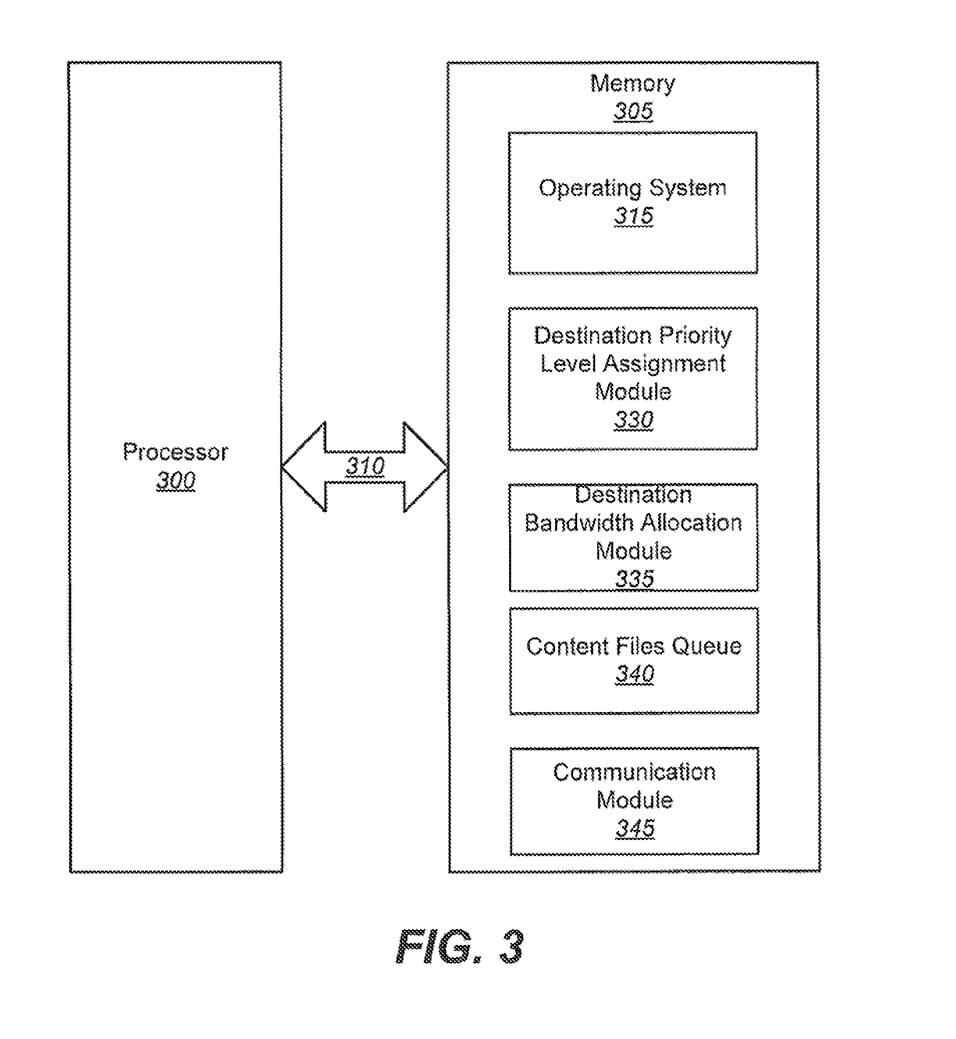
FIG. 3 is a block diagram that illustrates a software/hardware architecture for a bandwidth allocation system based on destination priority according to some embodiments of the inventive subject matter.

FIG. 3 illustrates a processor 300 and memory 305 that may be used in embodiments of data processing systems, such as the data processing system 200 of FIG. 2, for communicating content files based on destination priority in accordance with some embodiments of the inventive subject matter. The processor 300 communicates with the memory 305 via an address/data bus 310. The processor 300 may be for example, a commercially available or custom microprocessor. The memory 305 is representative of the one or more memory devices containing the software and data used for allocating bandwidth in accordance with some embodiments of the inventive subject matter. The memory 305 may include, but is not limited to, the following, types of devices: cache, ROM, PROM, EPROM, EEPROM, flash, SRAM, and DRAM.

As shown in FIG. 3, the memory 305 may contain up to five or more categories of software and/or data: an operating system 315, a destination priority level assignment module 330, a destination bandwidth allocation module 335, a content files queue 340, and a communication module 345. The operating system 315 generally controls the operation of the data processing system. In particular, the operating system 315 may manage the data processing system's software and/or hardware resources and may coordinate execution of programs by the processor 300. The destination priority level assignment module 330 may be configured to assign relative priority levels to various destination sites for delivery of one or more content files. The destination bandwidth allocation module 335 may be configured to allocate the bandwidth to the various destination sites on an outgoing communication link based on the relative priorities assigned to the destination sites. The content files queue 340 may represent a queue where content files are stored while awaiting transmission on an outgoing communication link. The content files in the queue may be assigned various transmission priorities relative to each other. The next file to be transmitted on an outgoing communication link may be the content file with the highest relative transmission priority in the queue 340. The communication module 345 may be configured to manage the communication protocols for transmitting content on an outgoing communication link according to some embodiments of the inventive subject matter.

Although FIG. 3 illustrates exemplary hardware/software architectures that may be used in data processing systems, such as the data processing system 200 of FIG. 2, for communicating content files based on destination priority, according to some embodiments of the inventive subject matter, it will be understood that the present invention is not limited to such a configuration but is intended to encompass any configuration capable of carrying out operations described herein. Moreover, the functionality of the data processing system 200 of FIG. 2 and the hardware/software architecture of FIG. 3 may be implemented in a variety of ways including, but not limited to, a single processor system, a multi-processor system, a multi-core processor system, or even a network of stand-alone computer systems, in accordance with various embodiments.

Computer program code for carrying out operations of data processing systems discussed above with respect to FIG. 3 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Figure 4:
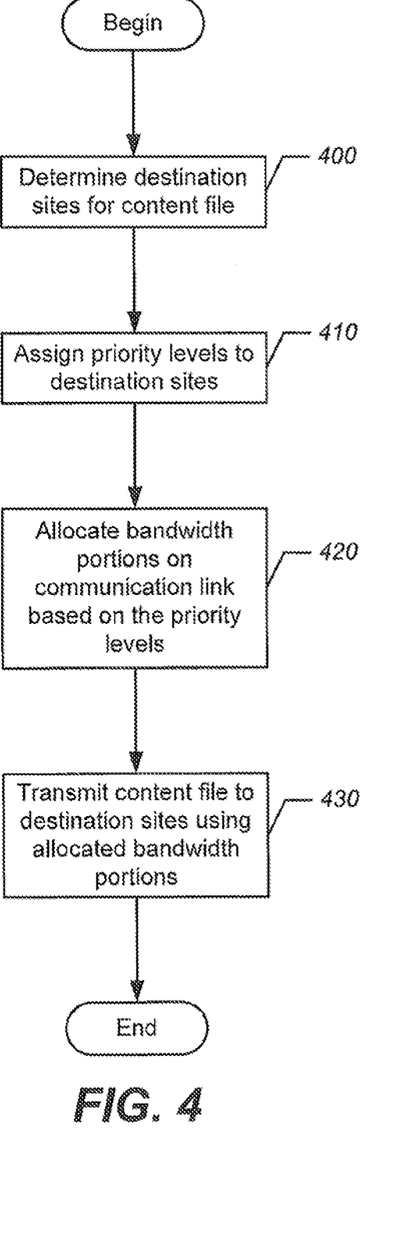
FIG. 4 is a flowchart that illustrates operations for communicating content files based on destination priority according to some embodiments of the inventive subject matter.

Operations of a communication network for communicating content files based on destination priority will now be described with reference to the flow charts of FIGS. 4 and 6-9 and the network diagram of FIG. 5. Referring now to FIG. 4, operations begin at block 400 where the destination priority level assignment module 330 determines which sites a content file is to be communicated or transmitted to. At block 410, the destination priority level assignment module 330 assigns relative priority levels to the different destination sites that were identified at block 400. The destination bandwidth allocation module 335 partitions the bandwidth of an outgoing communication link at block 420 such that portions of the bandwidth are allocated to the different destination sites for the content file based on the priority levels assigned at block 410. The content file is then transmitted or communicated to the various destination sites at block 430 via the communication module 345 and using the bandwidth portions allocated at block 420.

Figure 5:
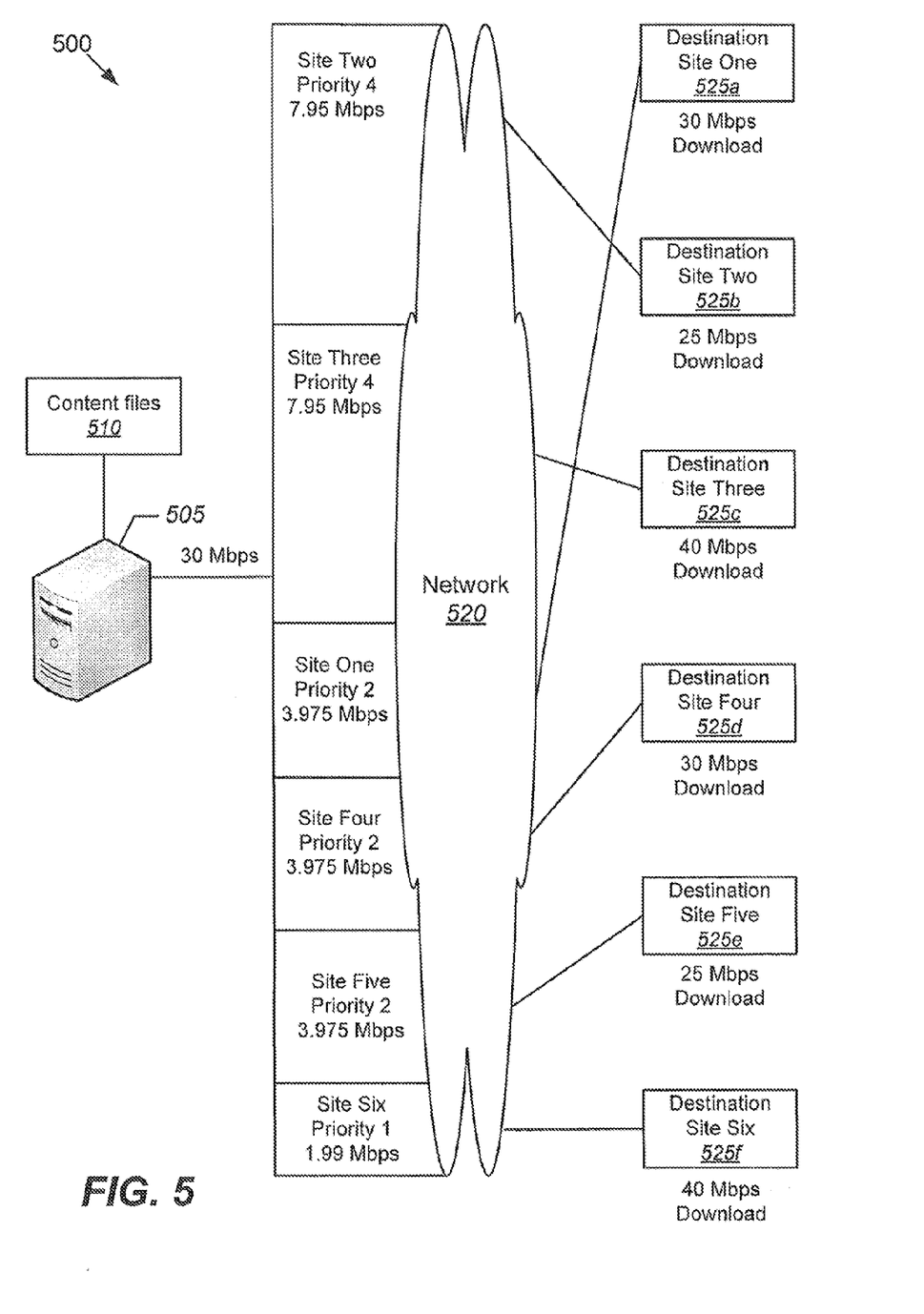
FIG. 5 is a block diagram of a communication network that illustrates operations for allocating bandwidth based on destination priority to communicate content files according to some embodiments of the inventive subject matter.

FIG. 5 is a diagram of a communication network illustrating operations for communicating content files based on destination priority according to some embodiments of the inventive subject matter. A content server 505 is connected to a network 520 via a 30 Mbps communication link. The content server 505 includes one or more content files 510 to be communicated to a plurality of destination sites 525a, 525b, 525c, 525d, 525e, and 525f. The network 520 may be a global network, such as the Internet or other publicly accessible network. Various elements of the network 520 may be interconnected by a wide area network, a local area network, an Intranet, and/or other private network, which may not be accessible by the general public. Thus, the communication network 520 may represent a combination of public and private networks or a virtual private network (VPN). The network 120 may be a wireless network, a wireline network, or may be a combination of both wireless and wireline networks.

As shown in FIG. 5 destination sites three and four have been assigned a priority level of four, destination sites one, four, and five have been assigned a priority level of two, and destination site six has been assigned a priority level of one. Thus, destination sites three and four are each allocated a 4/15 share of the 30 Mbps bandwidth of the outgoing communication link for communicating one or more of the content files 510, destination sites one, four, and five are each allocated a 2/15 share of the 30 Mbps bandwidth for communicating one or more of the content files 510, and destination site six is allocated a 1/15 share of the 30 Mbps bandwidth for communicating one or more of the content files 510. The destination sites 525a, 525b, 525c, 525d, 525e, and 525f may have particular download bandwidths associated therewith as shown in FIG. 5, which may be a factor in assigning priorities in bandwidth allocation outgoing from the content server 505. For example, if a destination site has a very high bandwidth pipe for downloading content, then it may be assigned a lower priority level in allocating bandwidth outgoing from the content server 505 because the destination site may make up for the lower transmission bandwidth with a higher download speed.

Figure 6:
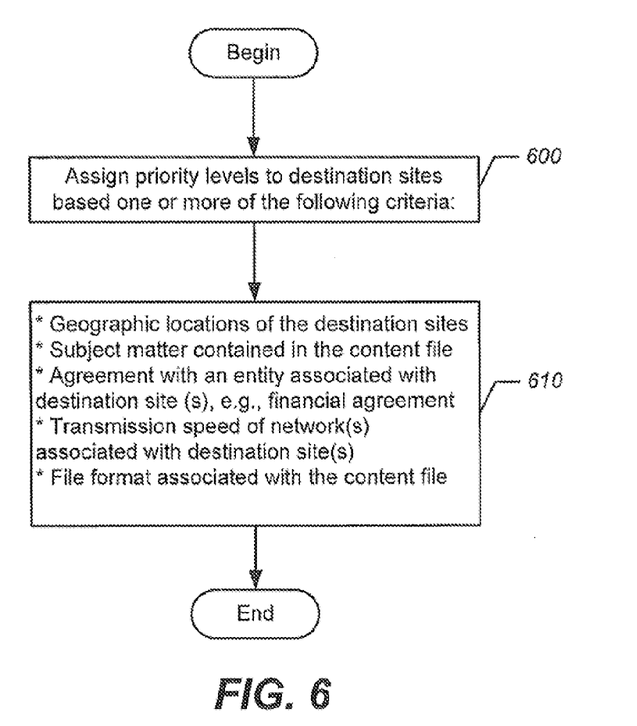
FIGS. 6-9 are flowcharts that illustrate further operations for coning content files based on destination priority according to some embodiments of the inventive subject matter.

Referring now to FIG. 6, at block 600 the destination priority level assignment module 330 assigns priority levels to the various destination sites to which the content file(s) are to be communicated based on criteria including, but not limited to, geographic locations of the destination sites, the subject matter contained in the content file(s), an agreement with an entity associated with a destination site, e.g., a financial agreement ensuring a minimum bandwidth allocation, the transmission or download speed of a network associated with the destination site(s), and/or a file format associated with a content file, e.g., it may be desirable to communicate a low resolution file quickly and follow up with a higher resolution version (block 610).

Figure 7:
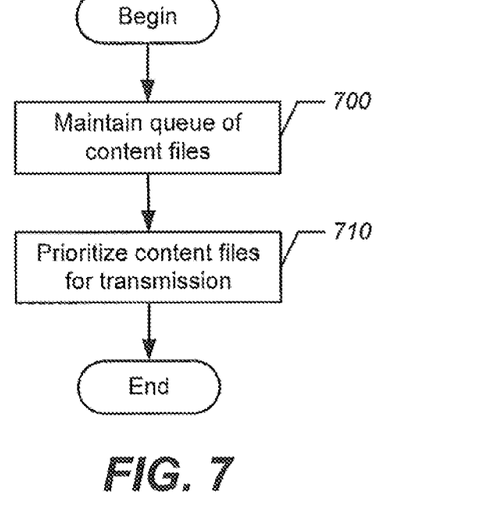

Referring now to FIG. 7, as described above with reference to FIG. 3, content files may be maintained in a queue 340 at block 700. The content files in the queue 340 may be prioritized for transmission at block 710 using the destination priority level assignment module 330 such that the content file selected for communication from the queue 340 is the content file having the highest relative transmission priority relative to the other content files in the queue. In accordance with various embodiments of the inventive subject matter, the content files buffered, for example, in the content files queue 340 of FIG. 3 may include, but are not limited to, video files, audio files, voice files, and/or text files.

Figure 8:
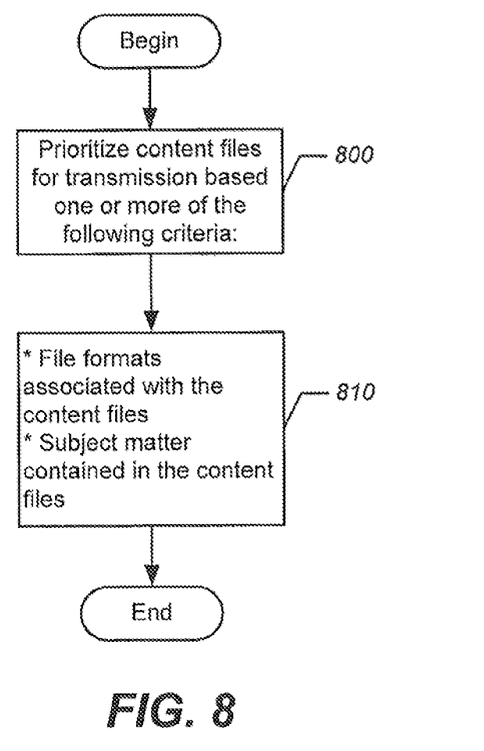

Referring now to FIG. 8, at block 800 content files may be prioritized for transmission using the destination priority level assignment module 330 based on criteria including, but not limited to, file formats associated with the content files, e.g., it may be desirable to communicate a low resolution file quickly and follow up with a higher resolution version and/or the subject matter contained in the content files, e.g., is the subject matter associated with a real time event (block 810).

Figure 9:
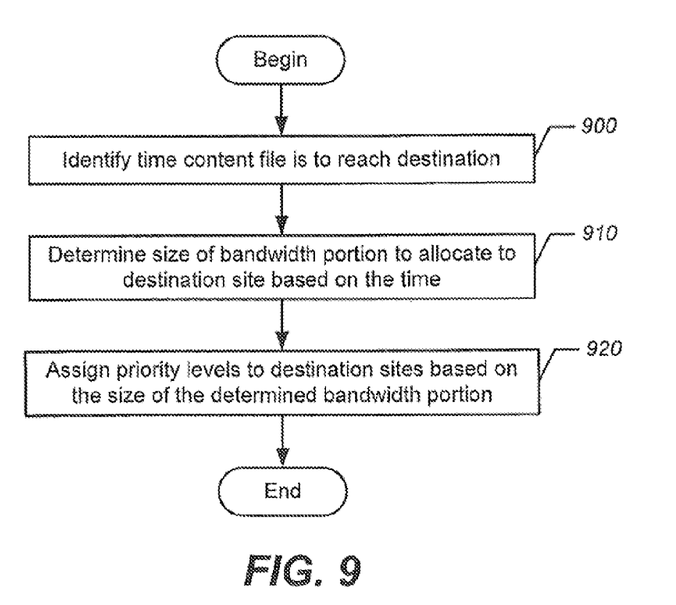

According to other embodiments of the inventive subject matter illustrated with respect to FIG. 9, a target time may be specified by which a content file is to reach a particular destination site at block 900. The target time may be received, for example, from a user or administrator and received via the operating system 315 utilities for handling input/output operations. The destination bandwidth allocation module 335 may then determine the size of the bandwidth needed to be allocated to the particular destination site on an outgoing communication link of the content server to communicate the content the to the destination site in the specified time at block 910. The destination priority level assignment module 330 may then assign priority levels to the various destination sites at block 920 to ensure that the bandwidth allocated to the destination site having the specified arrival time for the content file is sufficient to allow the content file to arrive on time. Thus, if target times have been specified for various content files, the content server may assign relatively low priority values to destination sites to receive small files with far off arrival times and relatively high priority values to destination sites to receive larger files with near term arrival times.

Embodiments of the present inventive subject matter may allow for the ability to prioritize delivery of content based on the destination. This may allow for file owners and/or communication network owners/operators to more efficiently use the resources of the communication network. In addition, by prioritizing delivery of content based on destination, there may be less need for human monitoring and auditing to ensure that content files reach destination sites in a timely manner.

FURTHER DEFINITIONS AND EMBODIMENTS

In the above-description or various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" or "/" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block, or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted, between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

That which is claimed:

1. A method, comprising:
    processing a content file to determine a plurality of destination sites to which the content file is to be transmitted;
    assigning priority levels to the plurality of destination sites;
    allocating a plurality of bandwidth portions on a communication link to the plurality of destination sites, respectively, based on the priority levels assigned to the plurality of destination sites; and
    transmitting the content file to the plurality of destination sites using the plurality of bandwidth portions allocated to the plurality of destination sites on the communication link, respectively;
    wherein assigning the priority levels to the plurality of destination sites comprises:
        identifying a time by which the content file is to reach one of the plurality of destination sites;
        determining a size of the one of the plurality of bandwidth portions associated with the one of the plurality of destination sites based on the time that was identified; and
        assigning the priority levels based on the size of the one of the plurality of bandwidth portions that was determined.

2. The method of claim 1, wherein assigning the priority levels to the plurality of destination sites comprises:
    assigning the priority levels based on geographic locations of the destination sites.

3. The method of claim 1, wherein assigning the priority levels to the plurality of destination sites comprises:
    assigning the priority levels based on subject matter contained in the content file.

4. The method of claim 1, wherein assigning the priority levels to the plurality of destination sites comprises:
    assigning the priority levels based on an agreement with an entity associated with one of the plurality of destination sites to receive a particular one of the priority levels.

5. The method of claim 4, wherein the agreement is a financial agreement.

6. The method of claim 1, wherein assigning the priority levels to the plurality of destination sites comprises:
    assigning the priority levels based on a transmission speed of a destination network associated with one of the plurality of destination sites.

7. The method of claim 1, wherein assigning the priority levels to the plurality of destination sites comprises:
    assigning the priority levels based on a file format associated with the content file.

8. The method of claim 1, further comprising:
    maintaining a queue comprising a plurality of content files; and
    prioritizing the plurality of content files for transmission;
    wherein the content file is one of the plurality of content files having a highest priority in the queue for transmission.

9. The method of claim 8, wherein prioritizing the plurality of content files for transmission comprises:
    prioritizing the plurality of content files for transmission based on file formats associated with the content files, respectively.

10. The method of claim 8, wherein prioritizing the plurality of content files for transmission comprises:
    prioritizing the plurality of content files for transmission based on subject matter contained in the content files.

11. The method of claim 1, wherein the content file comprises video, voice, audio, and/or text.

12. A data processing system, comprising:
    at least one processor; and
    at least one memory coupled to the at least one processor, the at least one memory comprising computer readable program code that when executed by the at least one processor causes the at least one processor to perform operations comprising:
    processing a content file to determine a plurality of destination sites to which the content file is to be transmitted;
    assigning priority levels to the plurality of destination sites;
    allocating a plurality of bandwidth portions on a communication link to the plurality of destination sites, respectively, based on the priority levels assigned to the plurality of destination sites; and
    transmitting the content file to the plurality of destination sites using the plurality of bandwidth portions allocated to the plurality of destination sites on the communication link, respectively;
    wherein assigning the priority levels to the plurality of destination sites comprises:
        identifying a time by which the content file is to reach one of the plurality of destination sites;
        determining a size of the one of the plurality of bandwidth portions associated with the one of the plurality of destination sites based on the time that was identified; and
        assigning the priority levels based on the size of the one of the plurality of bandwidth portions that was determined.

13. The data processing system of claim 12, wherein assigning the priority levels to the plurality of destination sites comprises:
    assigning the priority levels based on geographic locations of the destinations.

14. The data processing system of claim 12, wherein assigning the priority levels to the plurality of destination sites comprises:
    assigning the priority levels based on subject matter contained in the content file.

15. The data processing system of claim 12, wherein assigning the priority levels to the plurality of destination sites comprises:
    assigning the priority levels based on an agreement with an entity associated with one of the plurality of destination sites to receive a particular one of the priority levels.

16. The data processing system of claim 12, wherein assigning the priority levels to the plurality of destination sites comprises:

assigning the priority levels based on a transmission speed of a destination network associated with one of the plurality of destination sites.

17. The data processing system of claim 12, wherein assigning the priority levels to the plurality of destination sites comprises:

assigning the priority levels based on a file format associated with the content file.

18. A computer program product, comprising:

a non-transitory computer readable program medium comprising computer readable program code embodied thereon, the computer readable program code when executed by a processor causes the processor to perform operations comprising:

processing a content file to determine a plurality of destination sites to which the content file is to be transmitted;

assigning priority levels to the plurality of destination sites;

allocating a plurality of bandwidth portions on a communication link to the plurality of destination sites, respectively, based on the priority levels assigned to the plurality of destination sites; and transmitting the content file to the plurality of destination sites using the plurality of bandwidth portions allocated to the plurality of destination sites on the communication link, respectively;

wherein assigning the priority levels to the plurality of destination sites comprises:

identifying a time by which the content file is to reach one of the plurality of destination sites;

determining a size of the one of the plurality of bandwidth portions associated with the one of the plurality of destination sites based on the time that was identified; and assigning the priority levels based on the size of the one of the plurality of bandwidth portions that was determined.

\* \* \* \* \*

UNITED STATES PATENT AND TRADEMARK OFFICE
CERTIFICATE OF CORRECTION

PATENT NO. : 9,065,811 B2  
APPLICATION NO. : 13/856968  
DATED : June 23, 2015  
INVENTOR(S) : Phillips et al.

Page 1 of 1

It is certified that error appears in the above-identified patent and that said Letters Patent is hereby corrected as shown below:

In the specification

In Column 1, Line 22, delete "priority, in the" and insert -- priority. In the --, therefor.

In Column 1, Line 64, delete "outgoing," and insert -- outgoing --, therefor.

In Column 2, Line 15, delete "on the site" and insert -- on the size --, therefor.

In Column 2, Line 18, delete "comprising," and insert -- comprising --, therefor.

In Column 2, Line 39, delete "pan of this application" and insert -- part of this application, --, therefor.

In Column 2, Line 61, delete "coning" and insert -- communicating --, therefor.

In Column 3, Line 30, delete "increased," and insert -- increased --, therefor.

In Column 4, Line 19, delete "RANIDISK." and insert -- RAMDISK. --, therefor.

In Column 4, Line 37, delete "may be" and insert -- may be, --, therefor.

In Column 4, Line 43, delete "following," and insert -- following --, therefor.

In Column 6, Lines 1-2, delete "network 120" and insert -- network 520 --, therefor.

In Column 6, Line 16, delete "525h," and insert -- 525b, --, therefor.

In Column 7, Line 2, delete "the to the" and insert -- file to the --, therefor.

In Column 7, Line 25, delete "or various" and insert -- of various --, therefor.

In Column 8, Line 20, delete "blocks," and insert -- blocks --, therefor.

In Column 8, Line 66, delete "added/inserted," and insert -- added/inserted --, therefor.

Signed and Sealed this  
Seventh Day of June, 2016

Michelle K. Lee  
*Director of the United States Patent and Trademark Office*